(12) United States Patent
Blyler, Jr. et al.

(10) Patent No.: US 6,254,808 B1
(45) Date of Patent: Jul. 3, 2001

(54) PROCESS FOR FABRICATING PLASTIC OPTICAL FIBER

(75) Inventors: Lee L. Blyler, Jr., Basking Ridge; Arthur Clifford Hart, Jr., Chester; Todd R. Salamon, Chatham, all of NJ (US); Montri Viriyayuthakorn, Norcross, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/321,050

(22) Filed: May 27, 1999

(51) Int. Cl.[7] .................................................. B29D 11/00
(52) U.S. Cl. ......................... 264/1.29; 264/1.7; 264/2.7
(58) Field of Search .................................... 264/1.1, 1.24, 264/1.29, 1.7, 2.7; 425/133.1

(56) References Cited

U.S. PATENT DOCUMENTS

| | | | |
|---|---|---|---|
| 5,555,525 | * | 9/1996 | Ho et al. .............................. 264/1.29 |
| 5,593,621 | | 1/1997 | Koike et al. . |
| 5,599,897 | | 2/1997 | Nishiguchi et al. . |
| 5,614,253 | | 3/1997 | Nonaka et al. . |
| 5,639,512 | | 6/1997 | Nonaka et al. . |
| 5,729,645 | | 3/1998 | Garito et al. . |
| 5,760,139 | | 6/1998 | Koike et al. . |
| 5,783,636 | | 7/1998 | Koike et al. . |
| 6,106,745 | * | 8/2000 | Krins et al. .......................... 264/1.29 |

OTHER PUBLICATIONS

R. B. Bird et al., *Transport Phenomena*, John Wiley & Sons (1960).
Rajagopalan et al., Finite element methods for calculation of steady, viscoelastic flow using constitutive equations with a Newtonian viscosity, *J. Non–Newt. Fluid Mech.*, vol. 36, 159 (1990).
A.N. Brooks et al., *Comp. Meth. Appl. Mech. Eng.*, vol. 32, 199 (1982).
P. Hood, "Frontal solution program for unsymmetric matrices", *Int. J. Numer. Meth. Eng.*, vol. 10, 379 (1976).
D. Marcuse, *Principles of Optical Fiber Measurement*, Academic Press, New York, pp. 150–161 (1981).
J. Crank, The Mathematics of Diffusion, Second Edition, Oxford University Press, New York (1975).
H. Takahashi, et al. "Fabrication techniques of GI POF towards mass production", *7th International Plastic Optical Fibres Conference*, 8, pp. 50–54 (1998).

* cited by examiner

Primary Examiner—Mathieu D. Vargot
(74) Attorney, Agent, or Firm—Scott Rittman (57) ABSTRACT

A continuous extrusion process is provided capable of producing graded index plastic optical fiber at commercially useful speeds, e.g., at least 1 m/sec for 250 μm outer diameter fiber. Moreover, it is possible to predict the refractive index profile of the fiber, prior to actual fabrication, by performing a finite element analysis using various parameters of the extrusion process. Such prediction allows one to tune the parameters of the process to obtain a desirable outcome, while avoiding the need for substantial trial and error with the extrusion equipment.

30 Claims, 8 Drawing Sheets

PROCESS FOR FABRICATING PLASTIC OPTICAL FIBER

BACKGROUND OF THE INVENTION

1. Field of the Invention

The invention relates to fabrication of graded-index plastic optical fiber.

2. Discussion of the Related Art

Glass optical fiber has become a significant transmission medium in recent years, particularly for long distance transmission applications. Such optical fiber has not found significant usage, however, in smaller scale applications, such as distribution of fiber to the desk in local area networks. In particular, glass optical fiber has not been as cost effective as, for example, copper wire, and also requires extremely precise fiber connections. There has been interest, therefore, in pursuing plastic optical fiber (POF), which offers many of the benefits of glass optical fiber, but is expected to be more cost effective. POF also offers a larger core, which makes connection and splicing easier.

Initially, step index POF (having a core of one refractive index, surrounded by a cladding of a different refractive index) was manufactured and used. Unfortunately, the modes traveling along a step index fiber experienced an undesirably high level of dispersion, thereby limiting the fiber's capability. In response to this problem, graded-index POF (GI-POF) was developed, which possesses a varying refractive index from the core to the cladding layer. GI-POF exhibits a lower level of mode dispersion, thereby providing improved properties. GI-POF, however, was more difficult, and thus more expensive, to manufacture than step-index POF. Improved methods for manufacturing GI-POF were therefore sought.

One method of forming GI-POF is to start with a preform, similar to the preform from which glass optical fiber is generally drawn. See, e.g., U.S. Pat. Nos. 5,639,512 and 5,614,253, which discuss a process for chemical vapor deposition (CVD) formation of a preform for GI-POF. According to the process, a polymer and a refractive index modifier are deposited onto a rod, and the amount of refractive index modifier is varied during the deposition to provide the desired refractive index profile. While such preforms are useful for preparing GI-POF, easier processes are desired.

One alternative to preform formation is extrusion, which is commonly used with plastics to form a variety of items. Extrusion was expected to be quicker and cheaper than forming and drawing a preform, but the need for a graded refractive index profile created complications. U.S. Pat. No. 5,593,621 (the '621 patent) discusses an extrusion process for GI-POF. According to the '621 patent, GI-POF is manufactured by extruding one material circumferentially around another material, e.g., by use of a concentric nozzle. At least one of the materials contains a diffusible material having a distinct refractive index, such that the diffusion of the material provides the desired refractive index contrast. The method of the '621 patent appears to offer a functional process, but also appears to exhibit several drawbacks.

In particular, it is not clear that the process is able to be performed without providing a delay time (stopping the flow of material) or a very slow extrusion speed, to allow the diffusible material sufficient time to diffuse. Specifically, the examples disclose a small distance, 3 cm, between the outlet of concentric nozzle 5 (see FIG. 1) and the outlet of core nozzle 3. Thus, the two materials are in contact only over this small distance before exiting the apparatus. It is unclear whether this small contact distance allows sufficient diffusion, without requiring either intermittent stoppage or an extremely slow extrusion speed. It appears that either stoppage or low speed was used, because, for example, Embodiment 6 states that diffusion was effected for about 3 minutes within this contact region, and Embodiments 7, 8, and 9 all state that diffusion occurred for about 10 minutes in the contact region. Unfortunately, the reference does not disclose an extrusion speed nor make clear whether the process had to be halted intermittently. In addition, there is no information on how to predict the refractive index profile in the resulting fiber, and trial-and-error is apparently required to find appropriate process parameters.

Neither intermittent stoppage nor extremely slow extrusion speed is attractive from a commercial standpoint. Intermittent stoppage slows the process and creates discontinuities in the refractive index profile of the fiber. And a slow extrusion speed increases both the cost of the process and the time involved. Thus, improvements in processes for extruding graded index plastic optical fiber are desired. It would also be desirable to predict the refractive index profile that would result from a particular extrusion process, such that burdensome trial-and-error could be avoided.

SUMMARY OF THE INVENTION

The invention provides a continuous extrusion process capable of producing graded index plastic optical fiber (GI-POF) at commercially acceptable speeds, e.g., at least 1 m/sec for 250 µm outer diameter fiber. Moreover, it is possible to predict the refractive index profile of the fiber, prior to actual fabrication, by performing a numerical analysis for various parameters of the extrusion process. Such prediction allows one to tune the parameters of the process to obtain a desirable outcome, while avoiding the need for substantial trial and error with the extrusion equipment.

The process involves introducing a first, e.g., core, polymer material into a first nozzle and introducing a second, e.g., cladding, polymer material into a second nozzle, where at least one of the polymer materials includes a diffusible dopant having a refractive index that changes the refractive index of the polymer material. As reflected in FIG. 1B, the nozzles are arranged concentrically, the first nozzle located within the second nozzle such that the materials flow in a concentric manner upon introduction into a diffusion section 22. As the materials co-flow through the diffusion section 22, dopant diffusion takes place between and within the first and second polymer materials, such that the graded refractive index is achieved. The first and second polymer materials move continuously through the diffusion section 22, flow through an exit die 26, and are then drawn into fiber. (Continuous or continuously indicates that upon introduction into the diffusion section the polymer materials do not undergo intermittent stoppages at any point prior to flowing through the exit die.)

It was found to be possible to maintain substantially laminar flow between the polymers over a relatively long diffusion zone length, e.g., over 50 cm, or even over 100 cm, which is substantially longer than the short (3 cm) diffusion zone of the '621 patent. (Diffusion zone length 24, as shown in FIG. 1B, is the portion of the diffusion section 22 that begins at the first point of contact of the first and second polymers (at the exit of nozzle 30) in the co-extrusion head 20 and ends at the lower end of the exit die 26.) The flow rate of polymer from the exit die is typically as high as 3 cm³/min, which corresponds to a production rate of at least 1 meter/sec for 250 μm diameter fiber, although it is possible to scale up the process to even higher flows, as discussed herein. It is therefore possible to avoid the intermittent stoppages and/or extremely slow flow rate apparently required by the process of the '621 patent, which in turn makes it possible to continuously extrude the GI-POF at commercially useful rates.

Advantageously, parameters of the extrusion process are selected and material properties are determined prior to actual fabrication, based on a predicted dopant or refractive index profile. Relevant process and material characteristics include diffusion zone length and radius, flow rates of the core and cladding polymer materials, and dopant diffusivity in the core and cladding polymer materials. Other characteristics sometimes used include shear rate-dependent viscosities and densities of the first and second polymer materials (as functions of temperature), temperature of the diffusion section, and dopant mass fraction in the polymers. A numerical analysis is used to determine the expected dopant profile based on the provided values. The analysis makes it possible to determine the effect of varying any or all of these parameters, thereby avoiding much of the time-consuming and costly trial-and-error that would otherwise be required.

DETAILED DESCRIPTION OF THE INVENTION

Figure 1A:
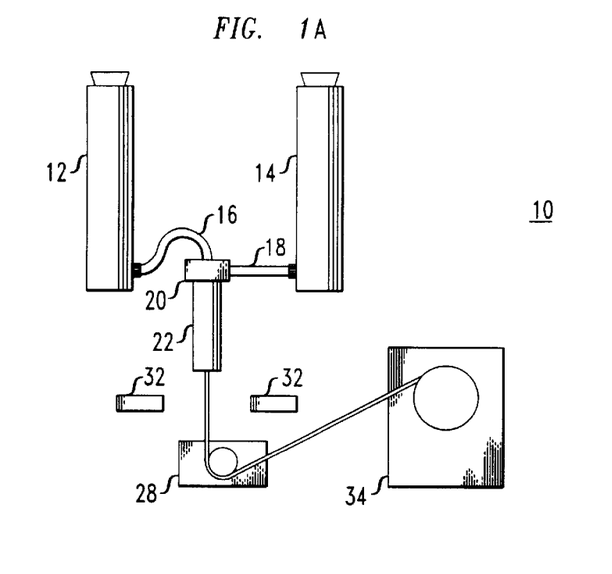
FIGS. 1A and 1B schematically illustrate an extrusion apparatus suitable for use in the invention.
Figure 1B:
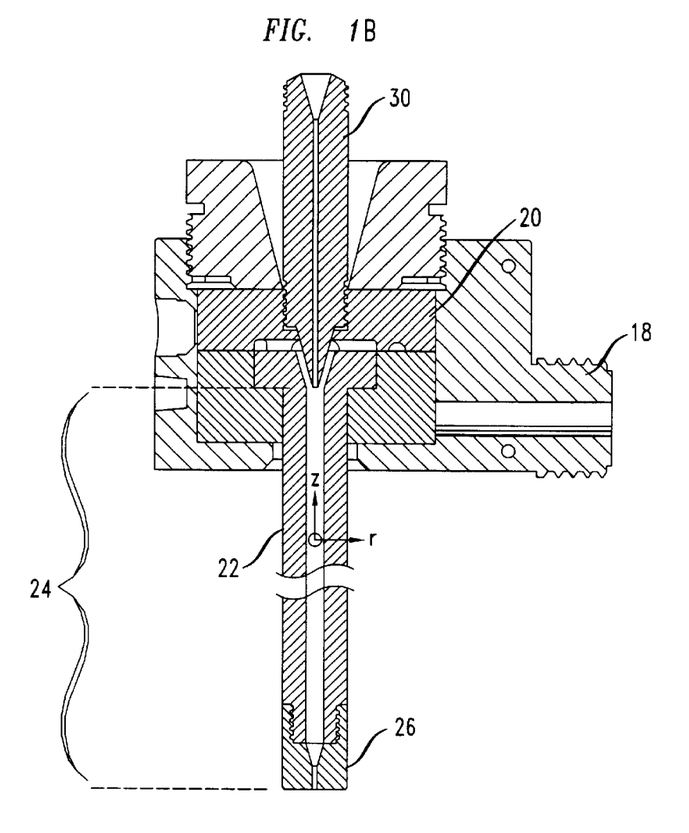

According to one embodiment of the invention, as reflected in FIG. 1A, core and cladding polymers are fed into, respectively, a core extruder 12 and a cladding extruder 14 of a fiber extrusion apparatus 10. The core and/or cladding polymer (typically the core polymer) contains one or more diffusible dopants that provide the desired graded index. The core polymer is fed from the core extruder 12 through a connector hose 16 into the co-extrusion head 20 (shown in more detail in FIG. 1B), and the cladding polymer is fed into the co-extrusion head 20 through a connector pipe 18. As shown in FIG. 1B, the co-extrusion head 20 contains a core nozzle 30 for directing the core polymer into the center of a diffusion section 22, while the cladding polymer from the connector pipe 18 is distributed concentrically around the core polymer into the diffusion section 22. The core polymer and cladding polymer flow together into the diffusion zone 24. (As reflected in FIG. 1B, the diffusion zone is the length of the section 22 that begins at the first point of contact of the core and cladding polymers (at the exit of nozzle 30) in the co-extrusion head 20 and ends at the lower end of the exit die 26.) The diffusion section 22 is generally heated to maintain flow of the molten polymer and promote diffusion of the diffusible dopant, and the zone 24 is of sufficient length to allow a desired extent of diffusion to occur. The polymers then flow from the section 22 into an exit die 26, which provides a desired diameter, and the exiting fiber is then pulled by a capstan 28 to draw the fiber at the necessary rate to obtain the desired final diameter of the fiber. The fiber is then typically taken up by a spool 34. A diameter monitor 32 is typically used to monitor the final diameter of the drawn fiber, such that adjustments can be made, if required.

The polymers are typically added to the extruders in solid granular form, and melted therein. Alternatively, it is possible for the polymers to be fed into the extruders in powder or molten form, using conventional equipment. The invention is capable of producing graded-index plastic optical fibers from a variety of transparent thermoplastic polymers exhibiting useful refractive index, glass transition temperatures and optical transmission characteristics, and for which compatible, refractive index-altering dopants exhibiting sufficient mobility at processing temperatures in the polymer are available. Glass transition temperature typically ranges from about 90° C. to about 260° C., refractive index typically ranges from about 1.3 to about 1.6, and transmission losses typically range from 10 to 1000 dB/km for the bulk polymer. Viscosities typically range from 100 to 1,000,000, and more typically 1000 to 100,000 poise. Examples of suitable polymers include poly(methyl methacrylate) (PMMA), polycarbonate, polystyrene, styrene-acrylonitride copolymers (SAN), poly(perfluoro-butenyl vinyl ether), (CYTOP™) and copolymers of tetrafluoroethylene and 2,2 bistrifluoromethyl-4,5-difluoro-1,3-dioxole (Teflon AF™).

The dopant is typically an index-raising substance added to the core polymer. (As used herein, dopant indicates one or more diffusible materials.) Alternatively, the dopant is an index-lowering substance added to the cladding polymer. Useful dopants are relatively low molecular weight compounds which: 1) are soluble in the polymers used for the GI-POF and do not phase-separate or crystallize in the polymers over time; 2) do not significantly increase the transmission loss of the polymers; 3) do not depress the glass transition temperature of the polymers by an unacceptable degree; 4) have sufficiently high diffusivities in the polymers at processing temperatures, e.g., $10^{-8}$ to $10^{-5}$ cm$^2$/sec; 5) provide large changes in refractive indices at low concentrations in the polymers, e.g., $\Delta n > 0.015$ for less than 15 wt. % dopant; 6) are chemically stable in the polymers at processing temperatures and in operating environments over the long term; 7) have low volatility at processing temperatures; and 8) are substantially immobilized in the glassy polymer in operating environments. Suitable dopants include bromobenzene, benzylbutylphthalate, benzyl benzoate, diphenyl phthalate, and diphenyl sulfide for use with PMMA, and per-halogenated oligomers and per-halogenated aromatic compounds, which optionally include heteroatoms, for use with CYTOP™ or Teflon AF™. In the diffusion zone, the dopant undergoes molecular diffusion from the molten core (or cladding) polymer into the molten cladding (or core) polymer to form the refractive index profile. After exiting the die, the fiber rapidly cools to room temperature and the dopant becomes substantially immobilized in the polymer.

The co-extrusion head, as illustrated in FIG. 1B, is designed to distribute an annular or concentric cladding melt stream around a centrally-located core melt stream in a smooth, laminar flow without disruption of the core/cladding interface. The diffusion section is generally of substantially uniform cross-section to maintain a smooth flow, and is generally tubular. The typical average diameter of the section in the diffusion zone is about 0.25 cm to about 1.0 cm, advantageously about 0.50 cm (diameter referring to inner diameter). The diffusion zone temperature is regulated, advantageously in a uniform manner throughout the zone, to promote a desired level of polymer flow and dopant diffusion. (Diffusion zone temperature is the average temperature to which the section and the polymer therein is heated.) In some cases it is advantageous to control some portion of the diffusion zone at a temperature which differs from adjacent portions for improved processing. For example, it is possible for the end of the diffusion zone to be held at a different temperature to improve the fiber draw down process. The section is heated by any suitable technique, e.g., by using a series of band heaters or high temperature heating tapes. Typical diffusion zone temperatures range from about 150° C. to about 300° C. It is possible for the zone to be made up of tubular elements capable of being threaded together, such that modification of the diffusion zone length is eased. Typical diffusion zone lengths are about 33 to about 400 cm, advantageously at least 50 cm, more advantageously at least 100 cm. This range of diffusion zone length, in combination with the above-noted temperature range, allows sufficient diffusion to occur while maintaining a continuous extrusion process, within the pressure limitation of typical extrusion equipment, at a commercially useful flow rate.

An exit die is located at the end of the diffusion section. It is possible to attach the die by threading it onto the end of the diffusion section, e.g., where the diffusion section is made up of threaded portions, as discussed previously. It is also possible for the exit die to be an integral part of the diffusion section. As reflected in FIG. 1B, the die generally has a tapered inlet that provides a transition from the cross-section of the diffusion section to a straight land at the end of the die. The land generally has a diameter of about 0.5 mm to about 2.5 mm. For example, final fiber diameters of around 250 $\mu$m are capable of being attained with a land of 1.0 mm diameter in combination with a capstan to draw the fiber from the die. A diameter monitor is typically used to measure the diameter of the fiber as it exits the die, in order to make any necessary adjustments. Typical diameters of fibers fabricated according to the invention range from about 125 to about 1000 $\mu$m. Residence time of the polymer materials in the diffusion zone is typically about 1 minute to about 120 minutes, and is based primarily on the stability of the polymer/dopant system. (Residence time indicates average residence time.)

Using this technique, it is possible to continuously extrude GI-POF at a flow rate of 3 cm$^3$/min, which leads to a production rate, for 250 $\mu$m diameter fiber, of 1 m/sec. (Generally, the flow rate ranges from about 1 to about 12 cm$^3$/min, corresponding to a production rate of about 0.33 to about 4 m/sec for 250 $\mu$m diameter fiber.)

As mentioned previously, for a specified polymer/dopant material system parameters of the extrusion process are advantageously selected based on a predicted refractive index profile of the GI-POF. In particular, it is possible to provide values for diffusion zone temperature, diffusion zone length, diffusivity of the dopant, and the flow rate of the core and cladding materials A numerical analysis is used to determine the expected profile based on the provided values. The analysis makes it possible to determine the effect of varying any or all of these parameters. Thus, a set of parameters expected to provide a desired outcome is selected. The analysis is as follows.

A. Governing Equations and Boundary Conditions

1. Governing Equations

The flow geometry for the extrusion process corresponds to diffusion zone 24, as shown in FIGS. 1A and 1B. A core region of doped polymer and an outer annular region of pure, undoped polymer flow into a cylindrical diffusion section 22 and enter the diffusion zone 24 at an axial location z=0. The materials proceed through the cylindrical diffusion section, in which they undergo both convection and diffusion. The diffusion zone is assumed for purposes of this analysis to operate isothermally at temperature $T_{oper}$ (i.e., $T_{oper}$ is the diffusion zone temperature). Because the fiber is rapidly cooled to room temperature upon exiting the exit die, diffusion is neglected in this draw-down region. Furthermore, because the length of the exit die 26 is significantly shorter than the length of the diffusion section 22, diffusion in the exit die region is neglected. (See Section B for an explanation of treatment of the exit die region.)

The equation governing the steady transport of dopant within the polymers within the diffusion zone is:

$$\nabla \cdot [(\rho \upsilon C(r,z))] = \nabla \cdot [\rho D \nabla C(r,z)], \quad (1a)$$

where C(r,z) is the dopant mass fraction, (r,z) represents a cylindrical coordinate system centered along the diffusion-zone axis (as shown in FIG. 1B), $\nabla$ is the gradient operator D is the dopant diffusivity, $\upsilon$ is the velocity field, $\rho$ is the density of the dopant/polymer system and T is the temperature.

(See R. B. Bird et al., *Transport Phenomena*, John Wiley & Sons (1960).)

For polymer/dopant systems in which the density is nearly constant over the range of mass fractions which result in complete miscibility (no phase separation), equation 1a simplifies to $$\upsilon \cdot \nabla C(r,z) = \nabla \cdot (D \nabla C(r,z)). \quad (1b)$$

In general the diffusivity is temperature- and mass fraction-dependent:

$$D = D(C,T).$$

At temperatures within 50° C. of the glass transition temperature, $T_g$, of the polymer, the diffusion coefficient tends to be strongly mass fraction-dependent, while for temperatures studied in this analysis, which are 100 to 150 degrees C. above $T_g$, the diffusivity is assumed to be dependent only upon temperature, namely $D(C,T)=D_0(T)$.

The functional form $D_0(T)$ is represented by $$D_0(T) = D_1 \exp\left(\frac{-E_{act}}{RT}\right). \quad (2)$$

The velocity field $\upsilon$ is determined from the equations governing the flow of an incompressible, inertialess generalized Newtonian fluid:

$$\nabla \cdot \sigma = 0, \quad (3)$$

$$\nabla \cdot \upsilon = 0, \quad (4)$$

where Equations (3) and (4) are, respectively, the momentum and global mass conservation equations, and $\sigma$ is the total stress tensor.

The total stress tensor is expressed in terms of the pressure p and the extra stress tensor $\tau$ as $$\sigma = -pI - \tau.$$

Completing the description of the flow problem requires specification of a constitutive equation that describes the rheology of the fluid. The dopant/polymer system is assumed to obey a generalized Newtonian fluid model such that the extra stress tensor is given by $$\tau = -\eta \dot{\gamma},$$

where $\eta$ is the viscosity, $\dot{\gamma}$ is the rate-of-strain tensor, $$\dot{\gamma} = [(\nabla \upsilon) + (\nabla \upsilon)^t],$$

and where superscript t denotes the transpose.

The viscosity $\eta$ is assumed to be dependent upon temperature, dopant mass fraction and shear rate $\dot{\gamma}$:

$$\eta = \eta(T, C, \dot{\gamma}),$$

where the shear rate is given by $$\dot{\gamma} = \sqrt{\frac{1}{2} \sum_i \sum_j \dot{\gamma}_{ij} \dot{\gamma}_{ij}}.$$

Experimental results at fixed temperature and dopant mass fraction indicate that the viscosity is well fit by a modified Carreau model $$\eta(\dot{\gamma}) = \eta_0 a_T \left[\frac{1}{[1 + (k a_T \dot{\gamma})^2]^{\frac{m}{2}}}\right],$$

where $\eta_0$ is the zero-shear rate viscosity at the reference temperature $T_o$, m is the Carreau exponent and k determines the onset of shear thinning. The parameter $a_T$ captures the temperature dependence of the viscosity:

$$a_T = \exp\left[\frac{E}{R_{gas}}\left(\frac{1}{T} - \frac{1}{T_0}\right)\right],$$

where E is the activation energy and $R_{gas}$ is the universal gas constant.

The mass-fraction dependence of the viscosity is generally accounted for by linearly interpolating the mass fraction-dependent parameters such that the final functional form for the viscosity is $$\eta(T, C, \dot{\gamma}) = \eta_o(C) a_T(T) \left[\frac{1}{[1 + \{k(C) a_T(T) \dot{\gamma}\}^2]^{m/2}}\right].$$

3. Setting Reasonable Boundary Conditions

Completing the description of the convection-diffusion problem requires specification of suitable boundary conditions. The fiber is assumed to have a step-index profile at the flow inlet into the diffusion section, $\partial D_i$ $$C(r, 0) = \begin{cases} C_0 \text{ if } r \leq R_{core} \\ 0 \text{ if } r > R_{core}, \end{cases} \quad (5)$$

where $R_{core}$ is the core polymer radius at the inlet, i.e., the location of the core/cladding interface. The velocity field at the inlet is assumed to be fully developed and to have a total specified volumetric flow rate $$Q_{total} = 2\pi \int_0^{R_0} v_z(r) r \, dr. \quad (6)$$

Specification of the total flow rate ($Q_{total}$) and the location of the core/cladding boundary ($R_{core}$) at the inlet completely specifies the inlet flow profile. The resulting core ($Q_{core}$) and cladding ($Q_{cladding}$) flow rates are determined from $$Q_{core} = 2\pi \int_0^{R_{core}} v_z(r) r \, dr,$$

and $$Q_{cladding} = 2\pi \int_{R_{core}}^{R_0} v_z(r) r \, dr,$$

respectively.

At the diffusion-zone walls $\partial D_s$ the fluid is assumed to satisfy the no-slip boundary condition $$\upsilon = 0, \quad (7)$$

and there is assumed to be no flux of the dopant $$(n \cdot \nabla C) = 0, \quad (8)$$

where n is a unit normal vector to the surface. Along the centerline $\partial D_c$ of the flow the velocity field is assumed to have no normal component $$(n \cdot \upsilon) = 0. \quad (9)$$

At the diffusion-zone outlet $\partial D_0$ convection is assumed to dominate diffusion in the flow direction such that Eq. (8) also applies. For the conditions studied in this analysis, the Peclet number based on the diffusion-zone radius, $Pe_R$, equals $$\frac{U R_0}{D},$$

where U, the average velocity within the diffusion zone, equals $$\frac{Q}{\pi R^2},$$

where Q is the flow rate in the diffusion zone.
Thus, $$Pe_R = \frac{Q}{\pi R D}.$$

For hypothetical numbers of: flow rate equal to 3 cm³/min, diffusion zone radius equal to 0.25 cm, and diffusivity equal to $10^{-6}$ cm²/sec, $Pe_R$ equals about 60,000. This large value of the Peclet number suggests that, within an axial length equal to one diffusion-zone radius from the end of the diffusion zone, the effect of axial diffusion is small relative to axial convection, and that the no-diffusive-flux boundary condition at the outlet, eq. (8), is a reasonable assumption. To further reduce the effect of the outflow boundary condition, the flow domain is extended an additional 10 cm beyond the intended length of the diffusion zone. For all of the calculations herein, the intended length of the diffusion zone is 100 cm, and thus the computational domain is extended to 110 cm.

Since the mass-fraction field couples with the flow field through the dependence of the viscosity on mass fraction, the flow field at the diffusion-zone outlet $\partial D_O$ is also assumed to be fully developed $$(nn{:}\sigma)=0, \quad (10)$$

and to have no tangential velocity component $$(t \cdot \upsilon)=0. \quad (11)$$

B. Profile Rearrangement at the Diffusion-Zone Exit

The dopant mass-fraction profile in the final extruded fiber is the parameter of interest. However, the mass-fraction profile within the diffusion zone is not representative of the final profile within the drawn fiber. The reason for this discrepancy is that the velocity profile rearranges from a radially varying profile within the diffusion zone $$\upsilon_z = \upsilon_z(r)$$

to a constant-velocity profile in the draw-down region outside the diffusion zone $$\upsilon_z = V(z).$$

The constant velocity V is related to the axial-velocity profile within the diffusion zone by a total mass balance $$V = \frac{2\pi \int_0^{R_0} \upsilon_z(r) r\, dr}{\pi R_1^2},$$

or equivalently $$V = \frac{Q_{total}}{\pi R_1^2}, \quad (12)$$

where $R_1(z)$ is the radius of the fiber beyond the exit die in the draw-down region.

This rearrangement of the velocity profile results in a radial spreading of the dopant mass-fraction profile. One physical explanation is that a cylindrical region of material in the center of the diffusion zone is moving faster than the average velocity of material within the diffusion zone due to the parabolic-like character of the flow field (Bird et al., supra). As this material exits the die, it must slow down relative to the average velocity corresponding to the plug flow. To conserve mass, this material must spread out radially in order to occupy a greater cross-sectional area. Similarly, material in an annular region near the diffusion-zone walls, which is moving more slowly than the average velocity, must increase speed to the average velocity. To conserve mass, this annular region must decrease in area, thereby shrinking towards the outer boundary of the fiber. The net effect is to have all material lines, or streamlines, within the diffusion zone move to a greater radial position within the final extruded fiber. The analytical relation that determines the final dopant mass-fraction profile within the drawn fiber is as follows.

The rearrangement of the velocity field results in a rearrangement of the dopant mass-fraction profile such that a material point at a location r within the diffusion zone is mapped to a new location $\hat{r}$ outside the exit die. The new location $\hat{r}$ can be determined by performing a mass balance on the fluid flowing within the region $0 \leq \xi \leq r$ in the diffusion zone and equating this to the amount of mass flowing within a cylinder of radius $\hat{r}$ moving at the plug flow velocity V(z)

$$\int_0^{\hat{r}} V(z) \xi\, d\xi = \int_0^r \upsilon_z(\xi) \xi\, d\xi. \quad (13)$$

Integrating the left-hand-side of Eq. (13) and substituting the value of V(z) from Eq. (12) results in the following form for the mapped radial position $\hat{r}$ $$\hat{r} = \sqrt{\frac{2\pi R_1^2 \int_0^r \upsilon_z(\xi) \xi\, d\xi}{Q_{total}}}.$$

Defining the normalized radius in the final extruded fiber as $$r^* = \frac{\hat{r}}{R_f},$$

where $R_f$ is the final fiber radius and the normalized radius in the diffusion zone as $$r' = \frac{r}{R_0},$$

we have that $$r^* = \sqrt{\frac{2\pi R_0^2 \int_0^{r'} \upsilon_z(\xi') \xi'\, d\xi'}{Q_{total}}}. \quad (14)$$

Eq. (14) allows the calculation of the dopant profile rearrangement that occurs because of the rearrangement of the velocity field. For example, to determine the dopant mass-fraction field in the final extruded and drawn fiber from a given profile at an axial location Z within the diffusion zone, the following relation applies $$C^{final}(r^*, z=Z) = C(r', z=Z), \quad (15)$$

where superscript "final" indicates correspondence to the profile of the drawn fiber. Eq. (15) is useful for determining the degree of diffusion that occurs for various diffusion zone lengths.

C. Numerical Methods

The steady-state, convection-diffusion problem defined by Eqs. (1), (3) and (4) with boundary conditions (5)–(11) is solved using a finite-element analysis that combines features from previous algorithms: a mixed finite-element method for discretizing the equations and boundary conditions, and local mesh refinement for computing accurate solutions near the diffusion front between the core and cladding materials.

The finite-element formulation is based on the formulation of Rajagopalan et al., "Finite element methods for calculation of steady, viscoelastic flow using constitutive equations with a Newtonian viscosity, 11 *J. Non-Newt. Fluid Mech.*, Vol. 36, 159 (1990). The method is based on mixed-order, Lagrangian polynominal interpolations for the velocity and pressure fields that satisfy the compatibility condition for Stokes flow in confined domains discretized by quadrilateral isoparameteric finite elements. The finite-element approximations for the velocity and pressure fields are denoted as $(v^h, p^h)$ where the superscript h denotes the dependence of the approximation on the characteristic mesh size h.

The finite-element approximation to the velocity field is constructed in the space of functions with square-integrable first derivatives such that the no-penetration condition on the diffusion-zone wall and centerline is automatically satisfied—this approximation space is referred to as $V^h$. The pressure field is assumed to be square-integrable, and the approximation space is written as $P^h$. The weak forms of the momentum and continuity equations and the associated boundary conditions are written for $v^h \in V^h, p^h \in P^h$ as $$(\sigma^h, \nabla u^h)_D - \langle u^h, n \cdot \sigma^h \rangle_{\partial D} = 0, \quad (16)$$

$$(q^h, \nabla \cdot v^h)_D = 0, \quad (17)$$

$\forall u^h \in V^h$ and $q^h \in P^h$, where equations (16) and (17) are the weak forms of the momentum and continuity equations, (3) and (4), respectively. The notation $(\cdot,\cdot)_D$ denotes the vector inner product defined on the domain D and $\langle \cdot, \cdot \rangle_{\partial D}$ denotes the inner product written as a line integral over the section of the boundary distinguished by the subscript.

The tangential component of the velocity field is set as an essential boundary condition along the inflow $\partial D_i$. The normal-velocity component is determined by solving a decoupled one-dimensional flow problem along the inflow where the solution satisfies the total flow rate constraint, eq. (6). The tangential components of velocity along the outflow and the diffusion-zone wall are set as essential conditions. The remaining boundary condition for the flow is the normal stress condition at the outflow. This condition is incorporated by rewriting the normal stress in components $$n \cdot \sigma^h = (nn:\sigma^h)n + (tn:\sigma^h)t. \quad (18)$$

Along the outflow boundary, Eq. (18) becomes $$n \cdot \sigma^h = (tn:\sigma^h)t, \text{ on } \partial D_o. \quad (19)$$

The mass-fraction field is constructed in the space of functions with square-integrable first derivatives, denoted as $W^h$. The weak form of the dopant diffusion equation is written as $$(\phi^h, v \cdot \nabla C^h)_D + (\nabla \phi^h, D(C^h) \nabla C^h)_D - \langle \phi^h, n \cdot D(C^h) \nabla C^h \rangle_{\partial D} = 0, \quad (20)$$

$\forall \phi^h \in W^h$. Note that for coarse meshes or flows with significant rearrangement of the stream lines, a stabilized method, such as the streamlined-upwind Petrov-Galerkin (SUPG) method may be required to discretize the dopant mass fraction equation (see A. N. Brooks and T. J. R. Hughes, *Comp. Meth. Appl. Mech. Eng.*, Vol. 32, 199 (1982)). Consistent with the requirement of square-integrability of the mass-fraction field, the step-index mass-fraction profile at the inlet, eq. (5), is replaced with the following continuous approximation $$C(r, 0) = C_0 \left[ \frac{1}{2} - \frac{1}{2} \tanh\left(\frac{r - R_{core}}{b}\right) \right].$$

The coefficient b scales the width of the interfacial region at the inlet. For the simulations presented herein, the value of b is $2 \times 10^{-4}$ cm, or approximately $1/1000^{th}$ of the diffusion-zone radius for a 0.25 cm radius cylindrical diffusion zone. The step-index mass-fraction profile at the inlet is specified essentially, while the no-flux condition along the diffusion-zone wall and outflow is specified weakly through the line integral appearing in Eq. (20).

Discrete forms of Eqs. (16)–(20) are created by expressing the mass-fraction field and velocity components in expansions of Lagrangian biquadratic polynomials $Q_2^h$ constructed so that $Q_2^h \subset W^h$ and $Q_2^h \subset V^h$, while the pressure field is written as an expansion of bilinear Lagrangian polynomials denoted by $Q_1^h \subset P^h$. These discretizations yield a large set of non-linear algebraic equations that are solved by Newton's method. The components of the Jacobian matrix are computed in closed form and the resulting linear equation set is solved by direct LU factorization by using frontal matrix methods (see P. Hood, "Frontal solution program for unsymmetric matrices, 11 *Int. J. Numer. Meth. Eng.*, Vol. 10, 379 (1976)).

The finite-element algorithm makes use of local mesh refinement near the diffusion front between the core and the cladding materials. A mesh having 29,991 degrees of freedom for calculation of the velocity, pressure and mass-fraction fields for the diffusion-zone simulations is used for all of the calculations herein.

The invention will be further clarified by the following examples, which are intended to be exemplary.

GI-POF FABRICATION

Experimental Technique

The polymer used for both core and cladding in the examples was poly (perfluorobutenyl vinyl ether), a transparent glassy ($T_g=108°$ C.) material manufactured by Asahi Glass Co. under the trade name CYTOP™, and having a refractive index of approximately 1.34. The dopant was relatively low molecular weight (MW~800) chlorotrifluoroethylene (CTFE) oligomer with a refractive index of approximately 1.41, as discussed in U.S. Pat. No. 5,783,630. In the examples, the dopant was added to the core polymer at a level of 15 wt. %.

Figure 12:
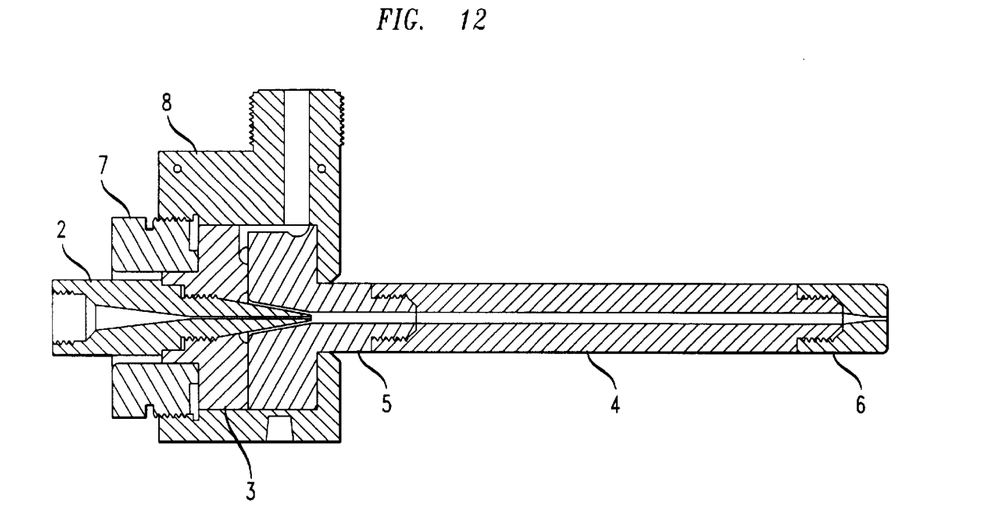
FIG. 12 shows an extrusion apparatus used for fabricating fiber according to the invention.

The extrusion apparatus used to fabricate the GI-POF is shown in FIG. 12. (All surfaces in contact with the flowing melts were polished to promote smooth flow with little material stagnation. The machining of all parts was carried out with high precision to ensure a good fit, and thereby prevent leakage. Due to the corrosivity of the materials being processed, all tooling components were made from corrosion resistant materials, e.g., Hastelloy.) Solid granules of the doped core polymer and undoped cladding polymer were separately fed from hoppers into ½ inch, vertically mounted Randcastle model RCP 0500 extruders. Both extruders had corrosion-resistant barrels and screws for processing fluoropolymers. The extruders each had controlled heating zones and precise drives for control of screw RPM. They were capable of delivering homogeneous controlled temperature melt streams at constant flow rate and pressure to the dual extrusion head through a heated connector hose (for the core material) and a cylindrical joint (for the cladding material).

The coextrusion head was designed to distribute the annular cladding melt stream around the central core melt stream in a smooth, laminar flow with no disruption of the interface between them. The joined streams coflowed axially in a tubular diffusion section of 5 mm inner diameter. The molten core material was introduced into the center of the crosshead assembly via a core tube 2, which included a gradually tapered (5°) internal cross section followed by a long, straight section of constant cross sectional area. The tapered region provided a transition in cross sectional area for the molten core material to flow from an extruder output nozzle to the smaller diameter required at the point the core and cladding materials are brought together. The inner diameter of the exit end of the core tube 2 was advantageously held at about 40% of the channel diameter in the die holder 5, just downstream, where the core and cladding materials are joined. This arrangement allowed the relative diameters of the core and cladding material streams to be controlled over wide ranges by simply varying the rate at which the individual streams were fed into the crosshead. The external surface of the exit end of the core tube 2 was also tapered (10°) and formed the interior wall of the transition region that directs the cladding material to flow into the channel in the die holder 5, where the cladding material joins with the core material.

The cladding material was introduced into the crosshead assembly via a channel in the crosshead housing 8, from which the cladding material flowed into a channel machined in the side of die holder 5. The material flowed upward and exited this channel to flow into distributing channels machined into the lower surface of core tube holder 3. The distributing channels assured a relatively uniform flow of cladding material around the tapered exterior of the core tube 2 by dividing the flow into four streams and introducing them into the tapered channel 90° apart. With this arrangement the core and cladding melt streams were joined together in a smooth regular manner, with very little, if any, disruption of the interface between the two materials or distortion of the concentric circular geometry of the core/cladding cross section.

The assembly was held together by nut 7, which threaded into crosshead housing 8, and clamped all assembled parts together to prevent leakage.

The diffusion sections 4 (only one shown) were threaded onto the die holder 5. The diffusion sections 4 had an inner diameter which matched that of the die holder. The sections 4 were modular and capable of being threaded together to provide a diffusion zone of desired length. The temperature of the section was controlled either by a series of band heaters or high temperature heating tapes, capable of independent control. In the diffusion zone, the dopant in the core polymer had sufficient mobility in the high temperature molten polymer to diffuse radially under the influence of the concentration gradient present at the core/cladding interface.

An exit die 6 was threaded onto the final diffusion section. The die had a 1.0 mm diameter straight land at the exit and a tapered inlet (10°) to transition the cross section from the diffusion section to the land. The GI-POF melt strand extruded from the die was drawn down to its desired diameter outside the die by pulling it at a controlled speed with a Heathway, Model HSM 048 capstan. A Model 910 LaserMike diameter monitor was positioned close to the die but beyond the drawdown region of the fiber to monitor the diameter. The fiber was taken up on a spool.

Wherever extrusion conditions were changed, a time equal to at least three times the average residence time of the material in the diffusion zone was allowed to elapse before taking a fiber sample for evaluation to ensure equilibrium of the profile. The refractive index profiles of the fiber samples were measured using a Leitz interference microscope via the transverse interferometric method (See D. Marcuse, *Principles of Optical Fiber Measurement,* Academic Press, New York, 1981, pp. 150–161.) A solution of water and propylene glycol in the weight ratio 92.2 to 7.8 was used to match the refractive index of the perfluorinated GI-POF cladding (1.340) for the measurement. The refractive index profiles of FIGS. 2–5 show the local refractive index increase from the index of the undoped CYTOP™ plotted against radial position normalized by the fiber radius.

Example 1: RPM Ratio of Core/Cladding Extruders

An experiment was run to determine the effect of the rpm ratio of the core and cladding extruder screws on the resultant profile of the fiber, keeping total output, length of the diffusion zone and diffusion zone temperature constant. The core extruder was run with a temperature profile that resulted in a melt temperature at the output to the co-extrusion crosshead of 190° C. The cladding extruder temperature profile was set to deliver melt at 220° C. The crosshead temperature was set at 220° C. and the temperature of the one meter long diffusion zone was set at 250° C. The combined (total) output of the extruders was about 6 grams (3 cm$^3$) per minute. For a 250 $\mu$m diameter fiber, this output corresponded to a production rate of 1 meter per second. Four separate experimental fibers were made. The first was made with a core extruder rpm of 2.7 and a cladding extruder rpm of 22.5 resulting in a core-to-cladding rpm ratio of 0.12 with an output of 6.2 grams per minute. The second fiber was made with a core extruder rpm of 4.0, a cladding extruder rpm of 22.5 resulting in a ratio of 0.18 with an output of 5.6 grams per minute. For the third fiber the core extruder rpm was 5.0, the cladding extruder rpm 22.5 resulting in a ratio of 0.22 and a total output of 5.6 grams per minute. The fourth fiber had the core extruder rpm set at 6.4, the cladding extruder rpm set at 22.5 resulting in a ratio of 0.28 with an output of 5.9 grams per minute.

Figure 2:
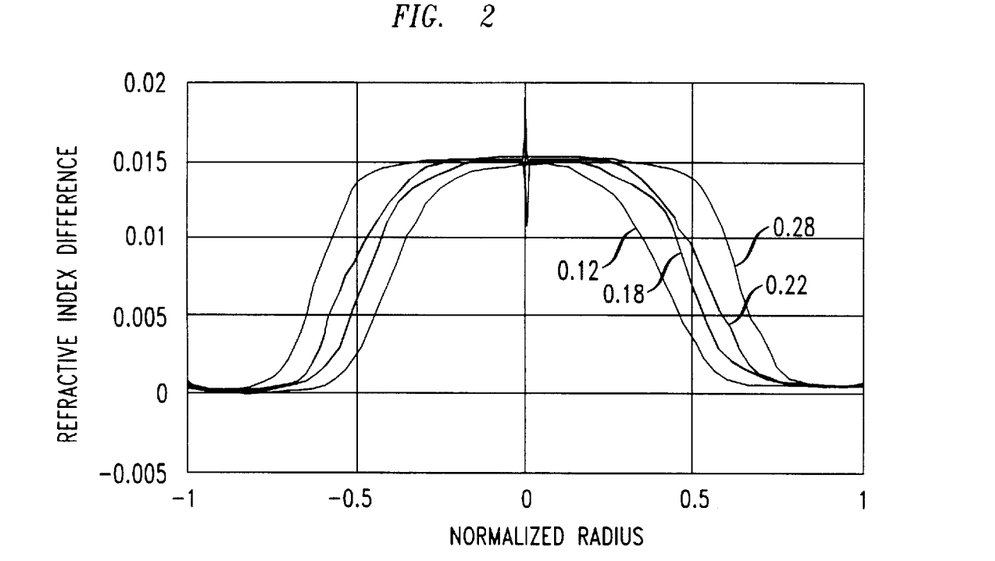
FIG. 2 shows refractive index profiles of fibers fabricated according to the invention.

As reflected in FIG. 2, a comparison of the resulting profiles shows that as the ratio of the core to cladding extruder screw rpm is increased, the diameter of the core increases and the refractive index profile becomes flatter at the center of the core.

Example 2: Output Rate

Another experiment was performed to determine the effect of output rate on the refractive index profile, keeping the diffusion zone length, the diffusion zone temperature and the core/cladding extruder rpm ratio constant. In this experiment the diffusion zone length was one meter, the diffusion zone temperature 250° C. and the core/cladding extruder rpm ratio approximately 0.2. In all cases the temperature profile on the core extruder was set to deliver melt to the co-extrusion crosshead at 190° C., while the profile on the cladding extruder was set to deliver material at 220° C. The co-extrusion crosshead was set at 220° C.

For the first fiber the core extruder rpm was 0.75, the cladding extruder rpm was 3.75 and the total output was 1.25 grams per minute. For the second fiber the core extruder rpm was 1.5, the cladding extruder rpm was 7.5 and the total output was 3.0 grams per minute. For the third fiber the core extruder rpm was 4.0 and the cladding extruder rpm was 22.5 and the total output was 5.6 grams per minute, this last output rate corresponding to a production rate of 0.95 m/sec for a 250 μm diameter fiber.

Figure 3:
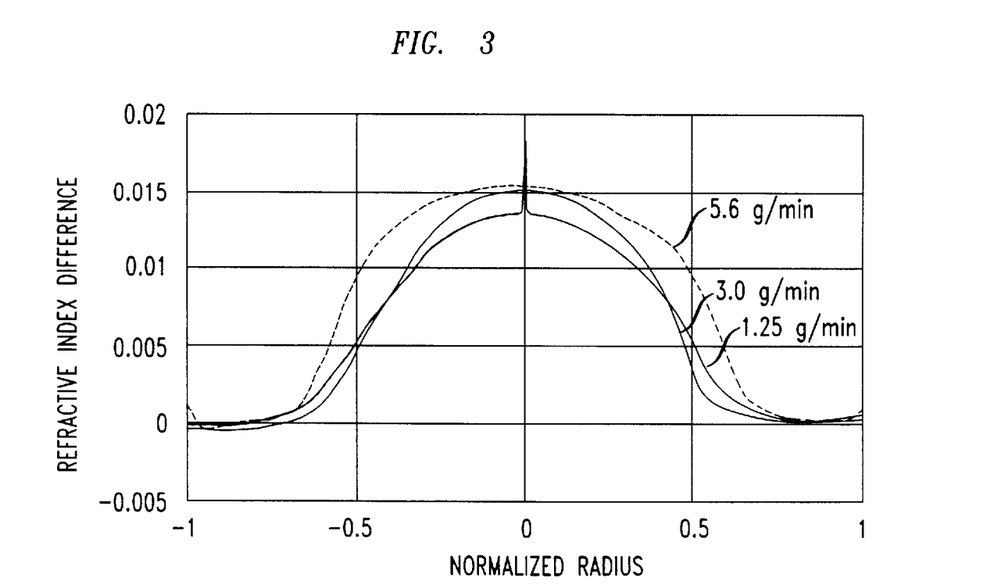
FIG. 3 shows refractive index profiles of fibers fabricated according to the invention.

As reflected in FIG. 3, a comparison of the profiles of the fibers in this experiment shows that as the total output rate of the of the process is increased, keeping all other process parameters fixed, the refractive index profile becomes increasingly steep at the core/cladding boundary, with an increasingly larger diameter and flatter region at the center of the core.

Example 3: Diffusion Zone Length

An experiment was performed to determine the effect of diffusion zone length on the profile of the GI-POF. For this experiment the co-extrusion crosshead temperature was set at 220° C., the core extruder rpm at 1.5 and the cladding extruder rpm at 7.5. The diffusion zone temperature was set to 230° C. for all lengths. For the first run the diffusion zone length was 0.67 meters. The fiber was drawn directly from the end of the diffusion section without using an exit die. Half of the diffusion section was then removed, leaving a diffusion zone length of 0.33 meters. A second fiber was drawn from this diffusion zone length. Finally the entire diffusion section was removed and a fiber was drawn directly from the co-extrusion crosshead.

Figure 4:
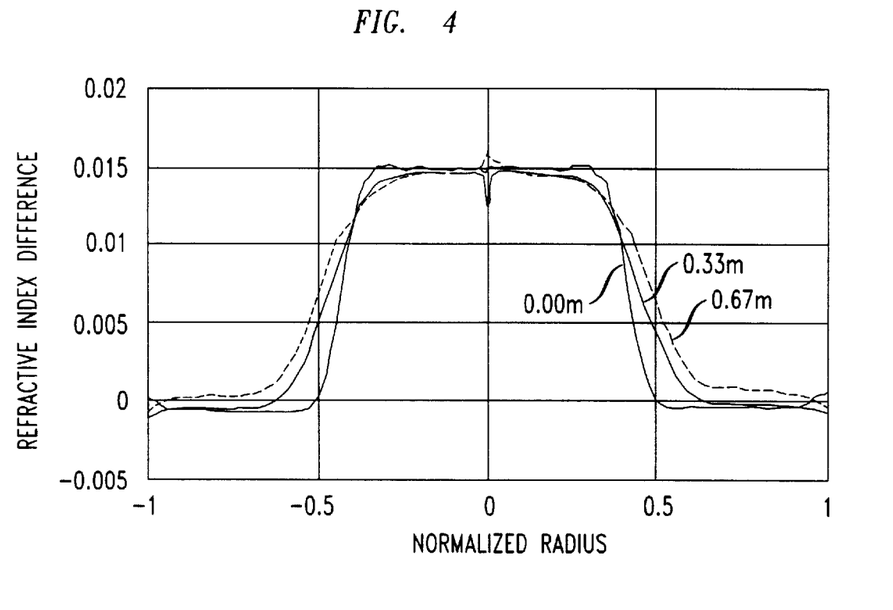
FIG. 4 shows refractive index profiles of fibers fabricated according to the invention.

As shown in FIG. 4, comparison of the three profiles shows that as the diffusion zone length is increased the refractive index gradient at the boundary between the core and cladding is reduced and made more gradual owing to the diffusion that occurs as the core and cladding polymers co-flow through the diffusion section.

Example 4: Diffusion Zone Temperature

An experiment was performed to determine the effect of diffusion zone temperature on the profile of the GI-POF. The crosshead temperature was set at 220° C. The temperature of the core melt entering the crosshead was set at 190° C. The temperature of the cladding material entering the crosshead was 220° C. For all runs the diffusion zone length was one meter, the output rate was approximately 6 grams/minute and the ratio of the core to cladding extruder screw rpm was held at 0.32 for all runs.

In the first run, the diffusion zone temperature was set at 230° C., the cladding extruder rpm was 10.6 and the core extruder rpm was 3.4 which resulted in an output rate of 6.2 grams per minute. In the second run the diffusion zone temperature was set at 270° C., and the individual core and cladding extruder rpm's were set at 3.2 and 10, respectively, keeping the ratio at 0.32 with an output of 5.9 grams/minute.

Figure 5:
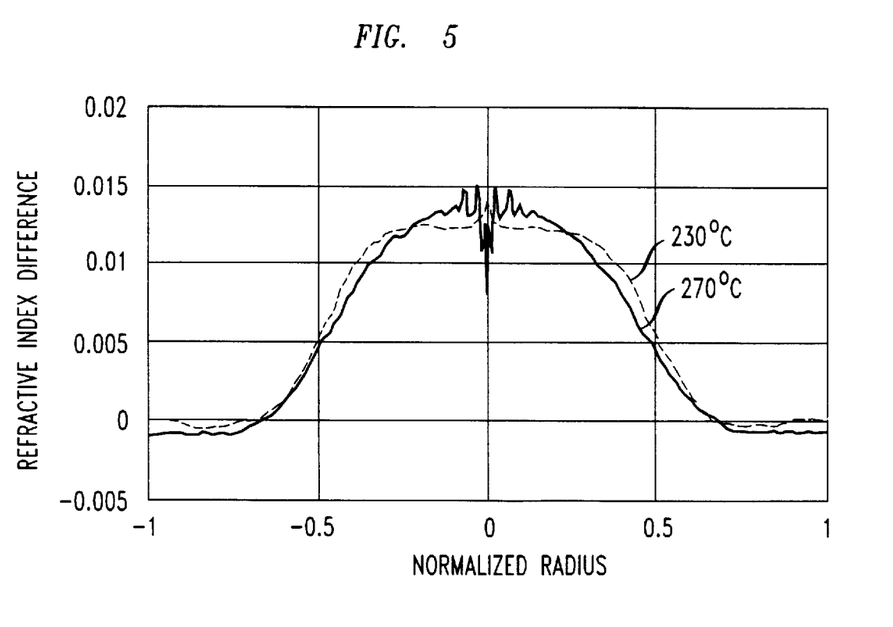
FIG. 5 shows refractive index profiles of fibers fabricated according to the invention.

As shown in FIG. 5, the profile for the fiber made at the low diffusion zone temperature (230° C.) shows a flat refractive index region in the center of the core and a relatively steep gradient at the core-cladding transition. The fiber made with the diffusion zone temperature of 270° C. shows rounding of the profile in the center of the core and a more gradual index gradient at the core-cladding boundary. These results are consistent with the expected increase in dopant diffusion rate as temperature is increased.

PREDICTED FIBER PROFILED BASED ON NUMERICAL ANALYSIS (As used below, $T_{oper}$ is diffusion zone temperature; $R_0$ is diffusion section radius; $R_{core}$ is the core polymer radius at the inlet of the diffusion section; and $Q_{core}$ and $Q_{total}$ refer to the flow rate of the core polymer and total polymer, respectively, at the inlet of the diffusion section. Parameters and values are based on the system used in Examples 1–4.)

Example 5: Effect of Diffusion Zone Length
Conditions: $T_{oper}$=300° C., $R_0$=0.25 cm, $R_{core}/R_0$=0.35 ($Q_{core}/Q_{total}$=0.273), $Q_{total}$=0.0707 cm$^3$/sec.

The value of $Q_{total}$ for this Example corresponds to making 300 micron diameter fiber at a production speed of 1 m/s or 250 micron diameter fiber at a speed of 1.4 m/s. As the core and cladding materials progress through the diffusion zone, the diffusion front separating these materials widens, indicating diffusion of the dopant into the cladding region. To illustrate this effect and to show the role of diffusion zone length in the extent of dopant diffusion, the dopant mass-fraction field is plotted as a function of normalized radius in FIG. 6A at different axial locations, z, within the diffusion zone. As the dopant material progresses through the diffusion zone, the profile diffuses away from the step-index profile at the inlet and towards a more smoothly varying profile. The profile at a distance of 100 cm into the diffusion zone exhibits significantly more diffusion of the dopant into the cladding region than at 50 cm.

Figure 6A:
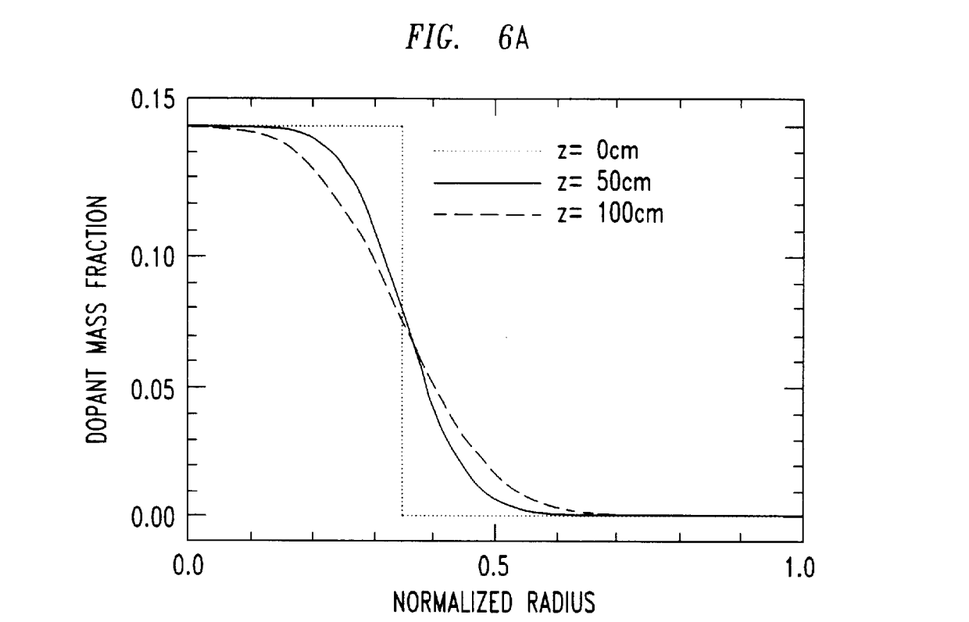
FIGS. 6A and 6B show dopant mass fraction profiles predicted according to the process of the invention.
Figure 6B:
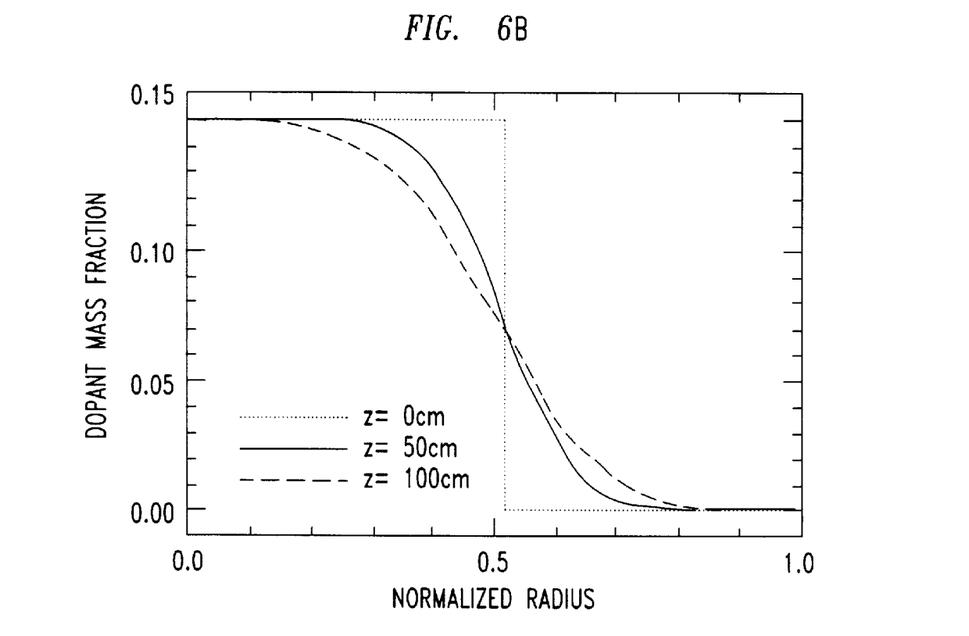

To illustrate the effect of rearrangement of the flow at the diffusion-zone exit (i.e., at the exit die) on the final dopant mass-fraction profile, the mapped profile reflecting this rearrangement, given by Eq. 15, is plotted in FIG. 6B as a function of normalized radius. The effect of the flow rearrangement on the final dopant profile is evident from the differences between FIGS. 6A and 6B.

Example 6: Effect of Operating Temperature
Conditions: $T_{oper}$=250° C., $R_0$=0.25 cm, $R_{core}/R_0$=0.35 ($Q_{core}/Q_{total}$=0.273), $Q_{total}$=0.0707 cm$^3$/sec.

Figure 7A:
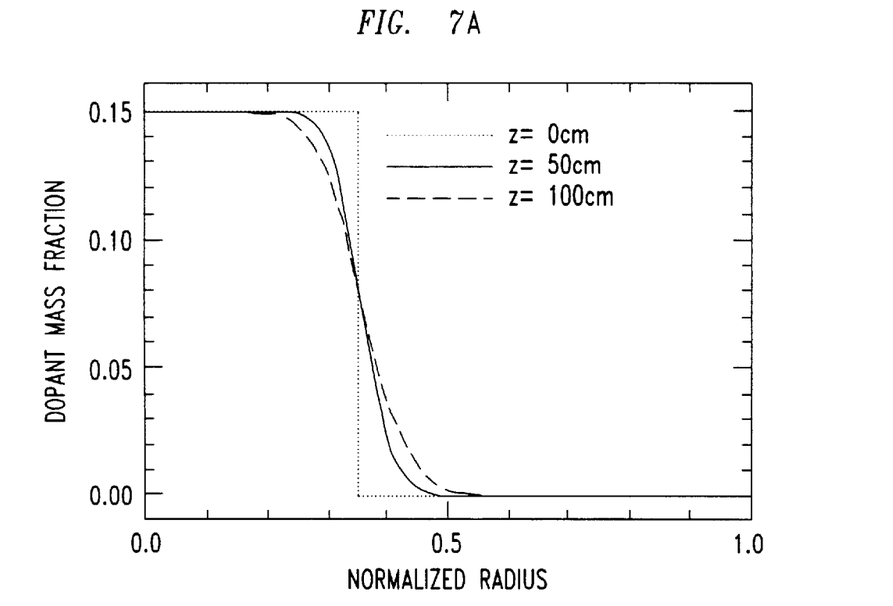
FIGS. 7A and 7B show dopant mass fraction profiles predicted according to the process of the invention.

To illustrate the effect of less diffusion at lower temperatures, the dopant mass-fraction field is plotted as a function of normalized radius in FIG. 7A at different axial positions within the diffusion zone. As the dopant material progresses through the diffusion zone, the profile gradually develops into a more parabolic-like profile. Contrasting FIGS. 7A and 6A shows that reduced temperatures result in a less diffuse mass-fraction profile. These results indicate that at lower temperatures a diffusion zone greater than 100 cm in length would be required to achieve the same level of diffusion as at 300° C.

Figure 7B:
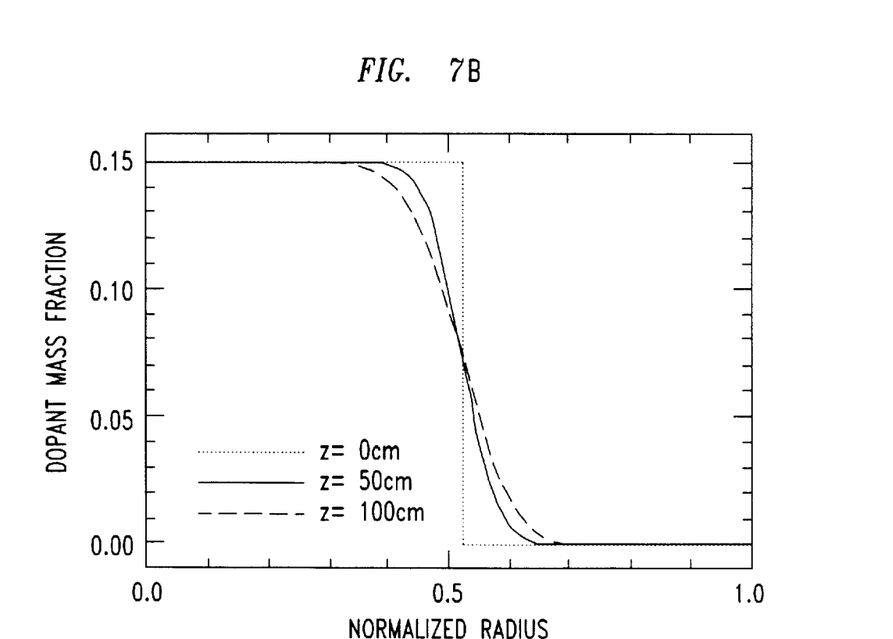

To illustrate the effect that rearrangement of the flow in the exit die has upon the final dopant mass-fraction profile, the mapped profile, given by Eq. 15, is plotted in FIG. 7B as a function of normalized radius. The significance of the flow rearrangement on the final dopant profile is evident from a comparison of FIGS. 7A and 7B.

Example 7: Effect of Diffusion-Section Radius
Conditions: $T_{oper}$=300° C., L=100 cm, $R_{core}/R_0$=0.35 ($Q_{core}/Q_{total}$=0.273), $Q_{total}$=0.0707 cm$^3$/sec.

Figure 8:
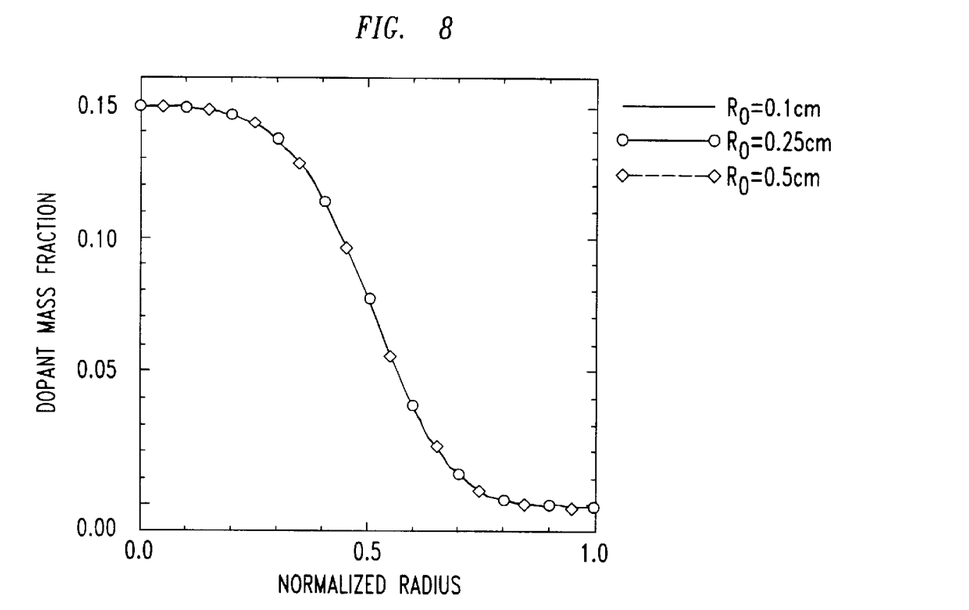
FIG. 8 shows dopant mass fraction profiles predicted according to the process of the invention.

The dopant mass-fraction field in the final fiber is plotted in FIG. 8 as a function of normalized radius for a diffusion zone of length 100 cm and for three different values of the diffusion-section radius: R=0.1, 0.25 and 0.5 cm. Note that all of the profiles superimpose and are indistinguishable with respect to the overall profile shape. These results indicate that the shape of the final dopant profile is substantially insensitive to the radial dimension of the diffusion section.

Example 8: Effect of Core/Cladding Flow Rates
Conditions: $T_{oper}$=300° C., L=100 cm, $R_0$=0.25, $Q_{total}$=0.0707 cm$^3$/sec.

Figure 9:
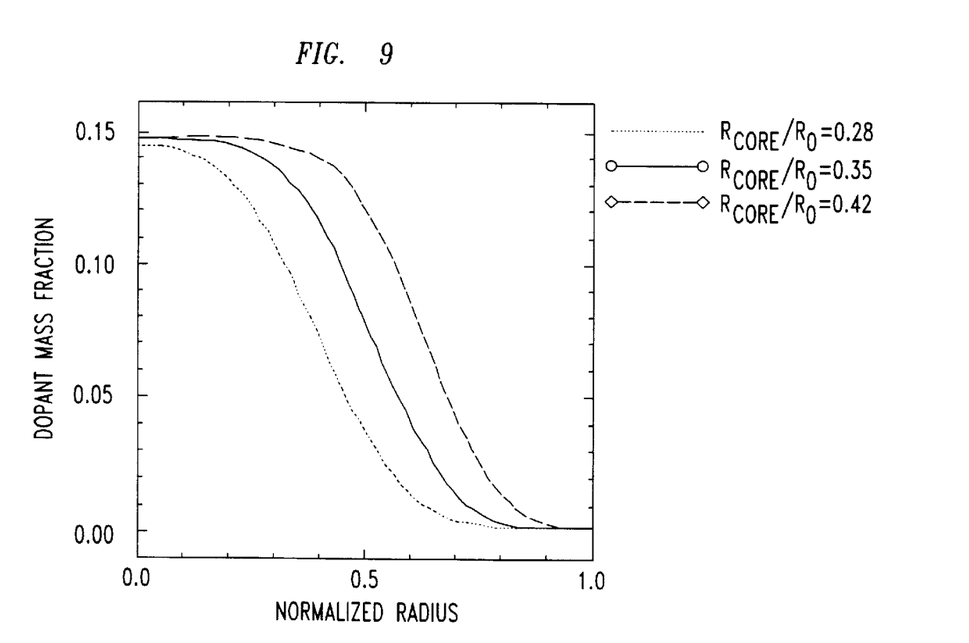
FIG. 9 shows dopant mass fraction profiles predicted according to the process of the invention.

The dopant mass-fraction field in the final extruded fiber is plotted as a function of normalized radius in FIG. 9 for a diffusion zone of length 100 cm and for three different values of the core/cladding interface position: $R_{core}/R_0$= 0.28, 0.35 and 0.42. These values correspond to the following ratios of core to total flow rates: $Q_{core}/Q_{total}$=0.134, 0.273 and 0.395, respectively. From the plot, it is apparent that increasing the fraction of core material tends to flatten the mass-fraction profile at the fiber center, and produces a broader core region that exhibits a steeper transition into the cladding region. Decreasing the fraction of core material has the opposite effect, producing a more rounded mass-fraction profile at the fiber center, narrowing the width of the core region and yielding a more gradual transition into the cladding region. These results demonstrate that adjusting the ratio of the core and cladding flow rates allows control of the dopant mass-fraction profile.

Example 9: Effect of Total Flow Rate

Conditions: $T_{oper}$=300° C., $R_0$=0.25 cm, $R_{core}/R_0$=0.35 ($Q_{core}/Q_{total}$=0.273).

Figure 10:
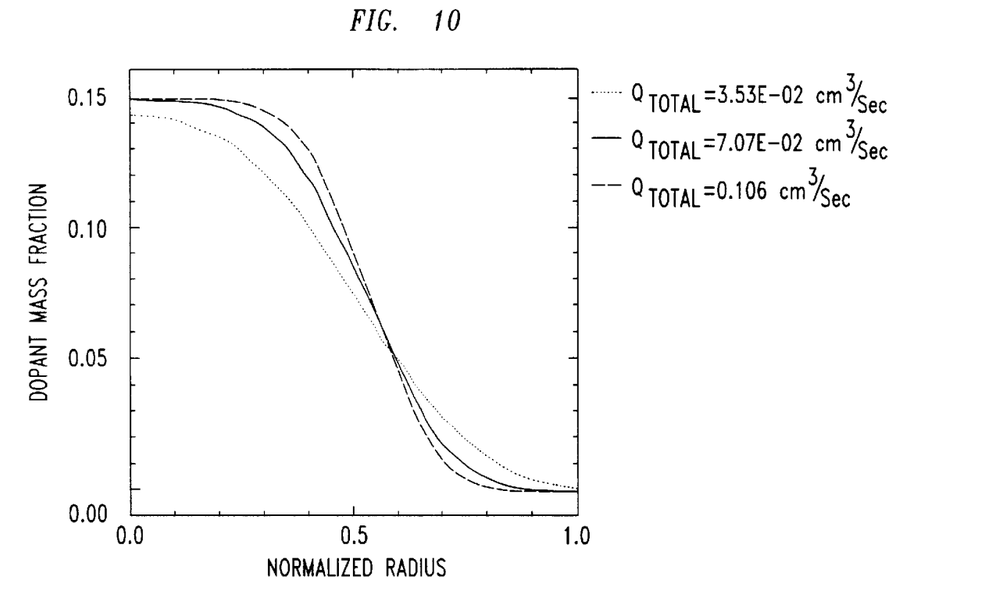
FIG. 10 shows dopant mass fraction profiles predicted according to the process of the invention.

The dopant mass-fraction field in the final extruded fiber is plotted in FIG. 10 as a function of radial position for a diffusion zone of length 100 cm and for three different total flow rates: $Q_{total}$=0.0353, 0.0707 and 0.106 cm³/sec, which correspond to making 300 micron diameter fiber at 0.5, 1 and 1.5 m/s, respectively. This set of conditions corresponds to a ratio of core to total flow rate of $Q_{core}/Q_{total}$=0.273. From the plots, it is apparent that decreasing the total flow rate increases the residence time in the diffusion zone and allows more time for dopant diffusion. Conversely, increasing the total flow rate decreases the residence time within the diffusion zone and less diffusion of the dopant is observed. The results indicate that the total flow rate affects the final dopant profile in the extruded fiber.

Example 10: Effect of Operating Conditions on Pressure Drop

Conditions: $R_{core}/R_0$=0.35 ($Q_{core}/Q_{total}$=0.273).

In Table 2, a sensitivity analysis examining the effect of operating temperature and manufacturing speed on the total pressure drop across diffusion zones of different radii is presented. The magnitude of the diffusivity is such that diffusion zones of length 1 and 4 m are assumed adequate for manufacturing 300 micron outer diameter fiber with a sufficiently diffuse profile at production rates of 1 m/s at $T_{oper}$ of 300 and 250° C., respectively. The results at the higher operating speeds of 2 and 4 m/s were obtained from the 1 m/s results at the same operating temperature and diffusion-zone radius using the following scaling: each doubling of the flow rate results in a factor of $2^2$=4 increase in total pressure drop, one factor of two because the pressure drop across a fixed section of the diffusion zone scales linearly with flow rate, the second factor of two because of the requirement of doubling the length of the diffusion zone to maintain the same average residence time of dopant within the diffusion zone. The net result is that the total pressure drop increases with the square of the total flow rate for a fixed diffusion-zone radius and operating temperature.

TABLE 2

| | ΔP (psi) | | | | | |
|---|---|---|---|---|---|---|
| | $T_{oper}$ = 250° C. | | | $T_{oper}$ = 300° C. | | |
| Operating | | $R_0$(cm) | | | | |
| Speed | 0.1 | 0.25 | 0.5 | 0.1 | 0.25 | 0.5 |
| 1 m/s ($Q_{total}$ = .0707 cm³/s) | 39,200 | 1,040 | 65.1 | 973 | 24.9 | 1.56 |
| 2 m/s ($Q_{total}$ = 0.141 cm³/s) | 157,000 | 4,160 | 260.4 | 3,890 | 99.7 | 6.23 |
| 4 m/s ($Q_{total}$ = 0.282 cm³/s) | 627,000 | 16,600 | 1,040 | 15,600 | 399 | 24.9 |

The results in Table 2 show that decreasing the operating temperature from 300° C. to 250° C. results in an almost forty-fold increase in pressure drop for all of the cases considered, a factor of ten due to the increase in viscosity and a factor of four due to the increased length of the diffusion zone required at the lower operating temperature. Decreasing the radius of the diffusion section has a dramatic effect on the total pressure drop—at 300° C. the diffusion section with radius 0.1 cm has a total pressure drop that is approximately 600 times greater than the diffusion section with radius 0.5 cm. This is due to the pressure drop scaling with $R_0^{-4}$ for Poiseuille flow in a tube (see R. B. Bird et al., supra). Thus, decreasing the radius by a factor of 5 from 0.5 cm to 0.1 cm is expected to increase the pressure drop by $5^4$=625, which is approximately the observed change. Finally, maximum pressure drops sustainable within extruders and associated tooling are on the order of 10,000 psi.

Example 11: Effect of Operating Conditions on Residence Time

A potential source of impurities in GI-POF is degradation of the dopant and/or polymer due to lengthy exposure to high temperatures. The average residence time within the diffusion zone is determined from the formula $$\bar{\tau} = \frac{\pi R_0^2 L}{Q_{total}}. \qquad (21)$$

Note that the average residence time scales with the square of the diffusion-section radius, so that doubling the diffusion-section radius results in a factor of 4 increase in average residence time. Reducing thermal exposure times requires that one reduce the diffusion-section radius to as small a value as is acceptable. Note that the results of the previous Example show that there are restrictions on the minimum allowable radius due to the generation of large pressure gradients across the diffusion zone.

Another feature of the above expression is that the average residence time is proportional to the ratio $L/Q_{total}$ (where L is diffusion zone length). Physical considerations suggest that this quantity should remain a constant for a given dopant profile, i.e., doubling of the flow rate will require a doubling of the diffusion-zone length to achieve the same dopant profile.

In Table 3, the average residence time within the diffusion zone is given as a function of diffusion-section radius and operating temperature for the profile shown in FIG. 6b at Z=100 cm. Note that for all of the results at the lower operating temperature of 250° C., the average residence time is a factor of four times greater than at 300° C. and the same diffusion-section radius due to the dopant's lower diffusivity.

Furthermore, for the diffusion zone with radius of 0.5 cm the average residence time is 4,444 s.

TABLE 3

| | $T_{oper} =$ 250° C. | | | $T_{oper} =$ 300° C. | | |
|---|---|---|---|---|---|---|
| | $R_0$(cm) | | | | | |
| | 0.1 | 0.25 | 0.5 | 0.1 | 0.25 | 0.5 |
| $\bar{t}$(s) | 176 | 1,111 | 4,444 | 44 | 278 | 1,111 |

Although the results of Example 10 show that a larger diffusion section radius is beneficial for lowering the total pressure drop across the diffusion zone, the quadratic increase in residence time with radius shown in this Example 11 suggests operating with as small a diffusion-section radius as possible to reduce thermal exposure. A diffusion section radius of $R_0=0.25$ cm appears to be an adequate compromise between these two conflicting criteria.

Example 12: Comparison with Experimental Results

Conditions: $T_{oper}=250°$ C., $R_0=0.25$ cm, $R_{core}/R_0=0.35$ ($Q_{core}/Q_{total}=0.273$), $Q_{total}=0.0491$ cm³/sec.

Figure 11:
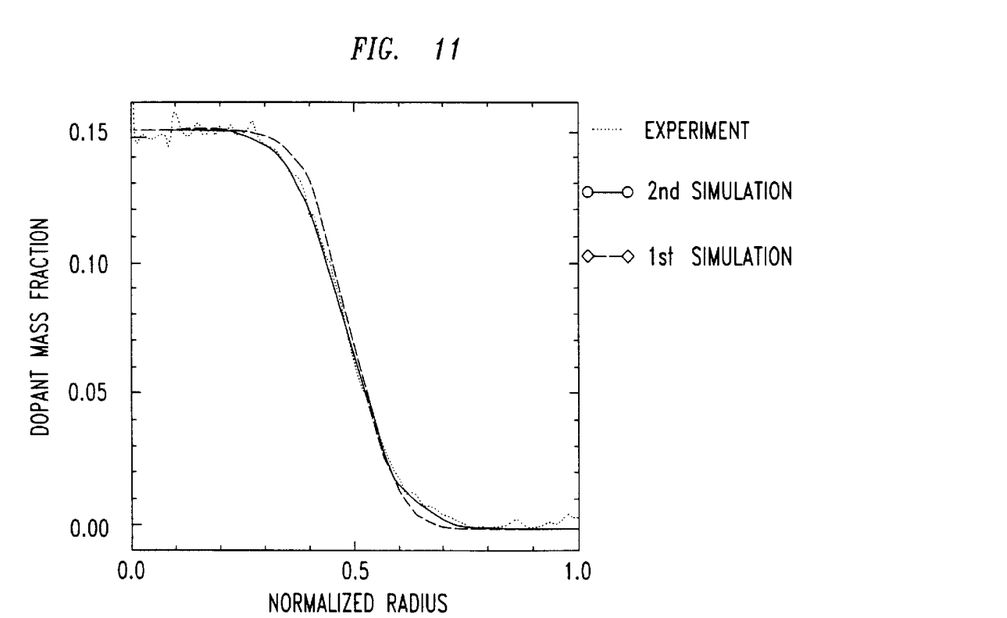
FIG. 11 shows a comparison between a predicted dopant mass fraction profile and a dopant mass fraction profile of a fabricated fiber.

Using apparatus and techniques of Examples 1–4, a comparison was made between fabricated fiber and a profile predicted by the finite element analysis of the invention. The operating conditions corresponded to manufacturing 250 μm fiber at a production rate of 1 m/s, with a diffusion zone length of 100 cm. The simulated and experimental dopant mass-fraction fields in the final extruded fiber are plotted in FIG. 11 as a function of normalized radius for a diffusion zone of length 100 cm and for two different values of the dopant diffusivity. There is good agreement between the experimental profile and a first simulated profile, although the experimental dopant profile is slightly more diffuse than the first simulated profile. Increasing the dopant diffusivity by a factor of 50% yields a second simulated profile that is in better agreement with the experimental profile. It is possible that this behavior is due to (i) underestimating the dopant diffusivity at elevated temperatures, or (ii) additional diffusion occurring in the draw-down region downstream of the diffusion zone which would account for the more diffuse experimental profile. The strong agreement with the simulations the higher diffusivity indicates that the diffusion coefficient at elevated temperatures is capable of being determined from fitting experimental data to numerical simulations.

Example 13: Design of Diffusion Section for Manufacture of GI-POF at High Rates

Scalability of the manufacturing process to high production rates is desirable. Requested fiber production rates are expected to be on the order of at least 1 meter/sec, with a pathway to scaling the process to several times this speed. A technique for designing the dimensions of the apparatus for manufacture of GI-POF at such faster production rates, possible according to the invention, is as follows.

As previously expressed in eq. 21, the average residence time of the polymers in the diffusion zone during extrusion is defined as $$\tau_{res}=\pi R_0^2 L/Q_{total}.$$

From an analysis of the initial stages of Fickian diffusion (see J. Crank, *The Mathematics of Diffusion*, Second Edition, Oxford University Press, New York, 1975), the following scaling relationship can be written for the total diffusion time, $\tau_{dif}$, required to achieve a desired profile in the diffusion zone $$\tau_{dif}=cR_0^2/D, \quad (22)$$

where c is a constant that scales the extent of diffusion in the zone.

Achieving the desired profile in the process requires that, $$\tau_{res}=\tau_{dif}. \quad (23)$$

Combining eq. 21–23 yields the relationship $$L=Q_{total}/\pi Pe_L D, \quad (24)$$

where $$Pe_L=1/c=Q_{total}/\pi LD \quad (25)$$

Figure 13:
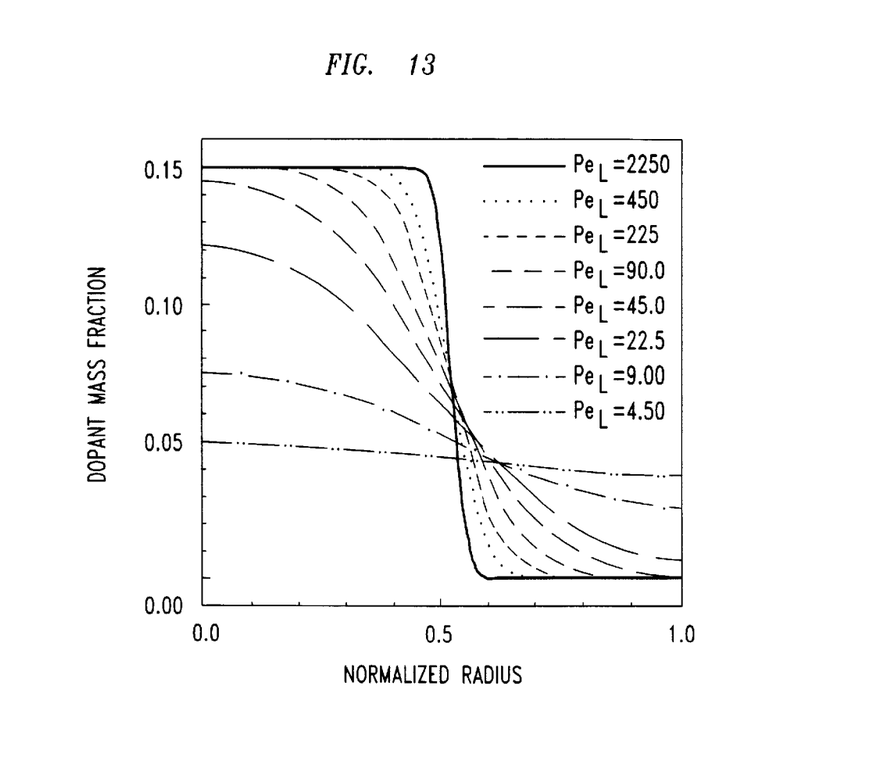
FIG. 13 shows dopant mass fraction profiles predicted according to the process of the invention, as a function of varying Peclet number.

$Pe_L$ is the Peclet number, and represents the magnitude of radial diffusion which occurs in the diffusion zone for a given length, L, diffusivity, D, and flow rate, $Q_{total}$. (It is possible to view the product LD as the sum of different lengths and diffusivities, e.g., in the case of several zones of different lengths and different temperatures.) Numerical simulations using finite element analysis such as presented in Examples 5–12 are used to indicate the values of $Pe_L$ in the range $$Pe_L^{min}<Pe_L<Pe_L^{max} \quad (26)$$

are acceptable for achieving desired dopant profiles. Below $Pe_L^{min}$, the dopant profile tends to be too diffuse, and above $Pe_L^{max}$, the dopant profile tends to be too step-like. Typically, $Pe_L^{min}$ is about 10, and $Pe_L^{max}$ is about 500. See, e.g., FIG. 13, which shows a predicted dopant mass fraction profile (vs. normalized radius), for a variety of Pe values. Thus, for an extent of diffusion defined by Pe, the necessary length of the diffusion section is able to be determined from eq. 24 by substituting values for $Pe_L$, $Q_{total}$ (proportional to the desired fiber production rate) and D.

The second parameter that requires specification is the radius of the diffusion section $R_0$. A minimum value for this parameter is able to be determined by specifying the maximum allowable pressure drop across the diffusion section, $\Delta P^{max}$. A reasonable representation of the pressure drop in the diffusion section is given by $$\Delta P=\eta_{clad} L Q_{total}/R_0^4, \quad (27)$$

where $\eta_{clad}$ is the viscosity of the cladding polymer. Therefore the minimum allowable radius, $R_0^{min}$, of the diffusion section is given by $$R_0^{min}=[\eta_{clad} L Q_{total}/\Delta P^{max}]^{1/4}. \quad (28)$$

Using the minimum radius, $R_0^{min}$, along with the diffusion section length, L, and the total flow rate, $Q_{total}$, it is possible to calculate the minimum residence time for the polymers in the diffusion section from eq. 21. It is then possible to make a decision as to whether this residence time is acceptable based on the thermal stability of the polymers and dopants. The maximum fiber production rate is able to be determined by the maximum residence time allowable at the processing temperature.

Thus, equations 24 and 28 allow specification of the diffusion zone length and minimum diffusion section radius for given values of the fiber production rate, extent of diffusion and material properties, $\eta_{clad}$, and D. This approach of the invention provides a pathway for scaling up the extrusion process to higher production rates.

Other embodiments of the invention will be apparent to those skilled in the art from consideration of the specification and practice of the invention disclosed herein.

What is claimed is:

1. A process for fabricating graded index plastic optical fiber, comprising the steps of:

introducing a first polymer material into a first nozzle;

introducing a second polymer material into a second nozzle concentrically located around the first nozzle, wherein at least one of the first polymer material and the second polymer material comprises at least one refractive index-altering diffusible dopant;

directing the first and second polymer materials from the first and second nozzles into a diffusion section in a concentric manner such that diffusion of the dopant is possible between and within the first and second polymer materials, wherein the materials flow through a diffusion zone having a length of at least 33 cm;

extruding the first and second polymer materials from the diffusion section through an exit die at a flow rate of at least 0.5 cm³/min; and drawing the materials from the exit die to form the optical fiber, wherein the first and second polymer materials encounter two distinct temperature regions after exiting the first and second nozzles and prior to drawing, the temperature of the distinct temperature regions being at least 50° C. above the higher of the glass transition temperature of the first polymer material and the glass transition temperature of the second polymer material.

2. The process of claim 1, wherein the diffusion zone length is at least 50 cm.

3. The process of claim 2, wherein the diffusion zone length is about 50 to about 400 cm.

4. The process of claim 1, wherein the diffusion section is tubular and the average diameter of the diffusion section is about 0.25 cm to about 2 cm.

5. The process of claim 4, wherein the diffusion section has an average diameter of about 0.50 cm.

6. The process of claim 1, wherein the residence time of the first and second polymer materials in the diffusion zone is about 1 minute to about 120 minutes.

7. The process of claim 1, wherein the resultant fiber has an outer diameter of about 125 μm to about 1000 μm.

8. The process of claim 7, wherein the fiber production rate is at least 0.5 meter per second.

9. The process of claim 8, wherein the fiber production rate is at least 1 meter per second.

10. The process of claim 1, wherein the first and second polymer materials are the same.

11. The process of claim 10, wherein the first polymer material comprises the dopant, and wherein the dopant has a refractive index greater than the refractive index of the first and second polymer materials.

12. The process of claim 1, wherein at least one of the first and the second polymer materials comprises at least two refractive index-altering diffusible dopants.

13. The process of claim 1, wherein the second polymer material comprises the at least one dopant.

14. The process of claim 1, wherein the Peclet number as a function of diffusion length ($Pe_L$), in the diffusion zone, is between 10 and 500.

15. A process for fabricating graded index plastic optical fiber, comprising the steps of:

introducing a first polymer material into a first nozzle;

introducing a second polymer material into a second nozzle concentrically located around the first nozzle, wherein at least one of the first polymer material and the second polymer material comprises at least one refractive index-altering diffusible dopant;

directing the first and second polymer materials from the first and second nozzles into a diffusion section in a concentric manner such that diffusion of the dopant is possible between and within the first and second polymer materials;

extruding the first and second polymer materials from the diffusion section through an exit die; and drawing the polymer materials from the exit die to form the optical fiber, wherein parameters of the process are selected based on a predicted dopant or refractive index profile obtained by:

(a) providing values for process and material characteristics comprising diffusion zone length, diffusion zone radius, dopant diffusivity in the first and the second polymer materials, and flow rate of the first and the second polymer materials;

(b) performing a numerical analysis using the values to calculate the predicted dopant or refractive index profile; and (c) optionally repeating steps (a) and (b).

16. The process of claim 15, wherein the process and material characteristics further comprise at least one of density of the dopant/polymer system, viscosity of the dopant/polymer system, and temperature of the diffusion section.

17. The process of claim 15, wherein the numerical analysis comprises a mixed finite element method for discretizing equations and boundary conditions and a local mesh refinement for computing solutions near the diffusion front between the first and the second polymer materials.

18. The process of claim 15, wherein the provided value for diffusion zone length is about 33 cm to about 400 cm, the provided value for diffusion zone radius is about 0.25 to about 2 cm, the provided values for diffusivity are about $1 \times 10^{-8}$ to about $1 \times 10^{-5}$ cm²/sec, and the provided value for flow rate is about 0.5 to about 15 cm³/min.

19. The process of claim 16, wherein the value for viscosity is about 1000 to about 100,000 poise.

20. The process of claim 15, wherein the diffusion section is tubular.

21. The process of claim 15, wherein the residence time of the first and second polymer materials in the diffusion zone is about 1 minute to about 120 minutes.

22. The process of claim 15, wherein the resultant fiber has an outer diameter of about 125 μm to about 1000 μm.

23. The process of claim 22 wherein the fiber production rate is at least 1 meter per second.

24. The process of claim 15, wherein the first and second polymer materials are the same.

25. The process of claim 24, wherein the first polymer material comprises the dopant, and wherein the dopant has a refractive index greater than the refractive index of the first and second polymer materials.

26. The process of claim 15, wherein at least one of the first and the second polymer materials comprises at least two refractive index-altering diffusible dopants.

27. The process of claim 15, wherein distinct temperature zones are provided over the diffusion zone length.

28. The process of claim 15, wherein the second polymer material comprises the at least one dopant.

29. The process of claim 15, wherein the Peclet number as a function of diffusion length ($Pe_L$), in the diffusion zone, is between 10 and 500.

30. The process of claim 15, wherein the numerical analysis includes calculations related to dopant profile rearrangement occurring upon exit of the first and second polymer materials from the exit die.

* * * * *